(12) United States Patent
Jin et al.

(10) Patent No.: US 10,665,883 B2
(45) Date of Patent: May 26, 2020

(54) SEPARATOR FOR FUEL CELL AND UNIT CELL OF FUEL CELL

(71) Applicants: Hyundai Motor Company, Seoul (KR); Kia Motors Corporation, Seoul (KR)

(72) Inventors: Sang Mun Jin, Yongin-si (KR); Kyung Min Kim, Namyangju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 196 days.

(21) Appl. No.: 15/656,040

(22) Filed: Jul. 21, 2017

(65) Prior Publication Data

US 2018/0145365 A1 May 24, 2018

(30) Foreign Application Priority Data

Nov. 22, 2016 (KR) .......................... 10-2016-0155430

(51) Int. Cl.
| | | |
|---|---|---|
| H01M 8/0247 | (2016.01) |
| H01M 8/0256 | (2016.01) |
| H01M 8/2404 | (2016.01) |
| H01M 8/241 | (2016.01) |
| H01M 8/0223 | (2016.01) |
| H01M 8/0258 | (2016.01) |
| H01M 8/1018 | (2016.01) |

(52) U.S. Cl.
CPC ....... *H01M 8/2404* (2016.02); *H01M 8/0223* (2013.01); *H01M 8/0258* (2013.01); *H01M 8/241* (2013.01); *H01M 2008/1095* (2013.01)

(58) Field of Classification Search
CPC ............................ H01M 8/02; H01M 8/2404
See application file for complete search history.

(56) References Cited

U.S. PATENT DOCUMENTS

| | | | | |
|---|---|---|---|---|
| 2003/0104262 A1* | 6/2003 | Kuroki | ............... | H01M 8/0213 |
| | | | | 429/510 |
| 2004/0137303 A1* | 7/2004 | Kuroki | ............... | H01M 8/0271 |
| | | | | 429/509 |
| 2005/0164064 A1 | 7/2005 | Cho et al. | | |
| 2005/0191539 A1* | 9/2005 | Yoshioka | ............ | H01M 4/8605 |
| | | | | 429/482 |

FOREIGN PATENT DOCUMENTS

| | | |
|---|---|---|
| KR | 20010106463 A | 11/2001 |
| KR | 20050077081 A | 8/2005 |
| KR | 20130057716 A | 6/2013 |

* cited by examiner

*Primary Examiner* — James Lee
(74) *Attorney, Agent, or Firm* — Slater Matsil, LLP

(57) ABSTRACT

A separator for a fuel cell and a unit cell of a fuel cell are disclosed. The separator for the fuel cell includes a separation plate having a coupling protrusion that protrudes from an edge thereof, and a porous body having a coupling hole into which the coupling protrusion is fixedly inserted, so that the porous body is coupled to a plane of the separation plate. The porous body defining a path in which reactive gases flow.

10 Claims, 5 Drawing Sheets

SEPARATOR FOR FUEL CELL AND UNIT CELL OF FUEL CELL

CROSS-REFERENCE TO RELATED APPLICATIONS

The present application claims priority of Korean Patent Application No. 10-2016-0155430 filed on Nov. 22, 2016, the entire contents of which is incorporated herein for all purposes by this reference.

TECHNICAL FIELD

The present disclosure relates to a separator for a fuel cell and a unit cell of a fuel cell.

BACKGROUND

A fuel cell is a kind of generator that electrochemically reacts chemical energy of fuel in a stack to convert the chemical energy into electric energy. The fuel cell may be used to supply not only driving power for industry, home and vehicles but also power for handheld electronic devices, such as portable devices. Recently, the use field of the fuel cell is being gradually expanded as a clean energy source with high efficiency.

FIG. 1 is an exploded perspective view illustrating a conventional fuel cell stack.

As illustrated in FIG. 1, the conventional fuel cell stack includes a membrane electrode assembly (MEA) 4 that has an electrolyte membrane and electrodes disposed on both surfaces thereof, a pair of gas diffusion layers (GDL) 6 that are attached to the electrodes of the membrane electrode assembly and aid in diffusing reactive gases, a separator 8 that is in close contact with each gas diffusion layer to supply the reactive gases, and a gasket 8a that prevents the leakage of the reactive gases.

The separator 8 prevents hydrogen and oxygen, which are reactive gases, from being mixed with each other, and is electrically connected to the membrane electrode assembly 4 to support it, thus serving to maintain the shape of the fuel cell stack.

Thus, the separator 8 should be delicate in structure to prevent reactive gases from being mixed with each other, and should have high strength as well as high conductivity to serve as a conductor and a support. Thereby, the separator 8 made of metal material is mainly used.

Since voltage generated from one unit cell 2 having the membrane electrode assembly 4, the gas diffusion layer 6, the gasket 8a, and the separator 8 is low, a plurality of unit cells is stacked and used depending on required voltage.

However, in the case of stacking many unit cells 2 as such, the separator 8 does not maintain a uniform surface pressure, thus causing local deformation, or does not maintain sealing.

Further, in order to fix the plurality of stacked separators 8, spot welding or laser welding is used. However, the corrosion resistance of a welded part is low, so that the welded part may be possibly corroded, and the welded part is lower in strength than a peripheral part, so that cracks or the like may be generated.

Particularly, when the thickness of the separator 8 is 0.1 mm or less, deformation may be caused by pressure during welding, and stackability is deteriorated.

In order to improve the stackability of the conventional separator 8, technology has been developed, in which uneven parts for fitting are formed on both sides of the separator 8 to improve the stackability. However, the above-mentioned method is problematic in that it is necessary to secure height that is sufficient for the uneven part to form a shape for fitting, and the separator 8 of 0.1 mm or less may be deformed or cracked in a pressing operation for fitting the uneven part.

The foregoing is intended merely to aid in the understanding of the background of the present invention, and is not intended to mean that the present invention falls within the purview of the related art that is already known to those skilled in the art.

SUMMARY

The present disclosure relates to a separator for a fuel cell and a unit cell of a fuel cell. Embodiments relate to a separator for a fuel cell and a unit cell of a fuel cell, which make it easy to assemble the separator for the fuel cell including a porous body using a coupling protrusion, and in which a coupling protrusion and a coupling groove are formed, respectively, on neighboring separators, thus improving an ability to stack unit cells of a fuel cell.

Embodiments of the present invention have been made keeping in mind the above problems occurring in the related art. For example, embodiments of present invention provide a separator for a fuel cell and a unit cell of a fuel cell, which make it easy to couple a separator with a porous body, thus shortening an assembly time and preventing a reduction in corrosion resistance.

Other embodiments the present invention provide a separator for a fuel cell and a unit cell of a fuel cell, which reduce a thickness of the separator, thus consequently reducing both volume and weight of the fuel cell.

Yet other embodiments provide a separator for a fuel cell and a unit cell of a fuel cell, which are capable of improving stackability for neighboring unit cells of the fuel cell.

The various embodiments can be used in combination.

According to one aspect, a separator for a fuel cell includes a separation plate provided with a coupling protrusion that protrudes from an edge thereof. A porous body is provided with a coupling hole into which the coupling protrusion is fixedly inserted, so that the porous body is coupled to a plane of the separation plate. The porous body defines a path in which reactive gases flow.

The separation plate and the porous body may include on both sides of edges thereof at least one pair of coupling protrusions and coupling holes, respectively, to face each other.

Each of the coupling holes may be formed in a shape of a slit, and have a width such that a length of a minor axis of the coupling hole corresponds to a diameter of the corresponding coupling protrusion.

The coupling holes disposed to be opposite to each other may be formed such that the major axes thereof are perpendicular to each other.

Each of the coupling protrusions may be formed such that a diameter of an end thereof is larger than the length of the minor axis of the corresponding coupling hole.

The coupling protrusion may be inserted into the coupling hole to be movable in a direction of the major axis of the coupling hole, thus absorbing deformation due to springback when the separation plate is coupled with the porous body, and consequently securing flatness.

The separation plate may further include a gasket attached to the plane thereof, the fixing protrusion being formed on the gasket.

According to another aspect, a unit cell for a fuel cell is formed by stacking a plurality of unit cells. The unit cell includes a pair of separators disposed on both sides of the unit cell. A fixing protrusion is provided on one separator selected from the pair of separators, and a fixing groove is formed in a remaining one of the pair of separators to allow the fixing protrusion to be fixedly inserted therein. The fixing protrusion and the fixing groove allow neighboring unit cells of the fuel cell to be easily coupled with each other.

The fixing protrusion may comprise a plurality of fixing protrusions, and the fixing groove may comprise a plurality of fixing grooves, and each of the fixing grooves may be formed in a shape of a slit to allow the fixing protrusion to be movable while being disposed in the fixing groove.

The fixing grooves disposed to be opposite to each other may be formed such that major axes thereof are perpendicular to each other.

The fixing protrusion may be formed such that a diameter thereof increases towards an end thereof, and the fixing groove may be formed such that a width thereof gradually increases in a direction into which the fixing protrusion is inserted, to correspond to a section of the fixing protrusion.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 1:
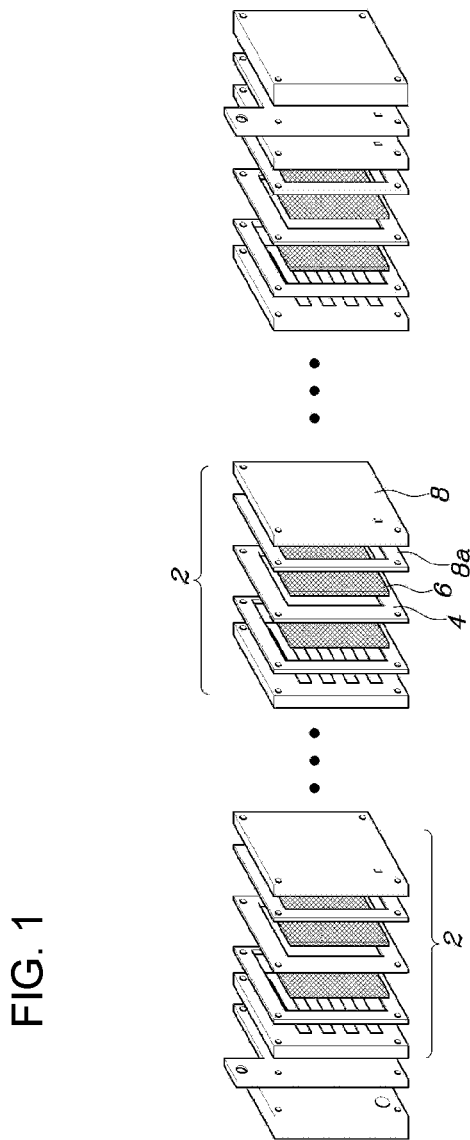
FIG. 1 is an exploded perspective view illustrating a conventional fuel cell stack.
Figure 2:
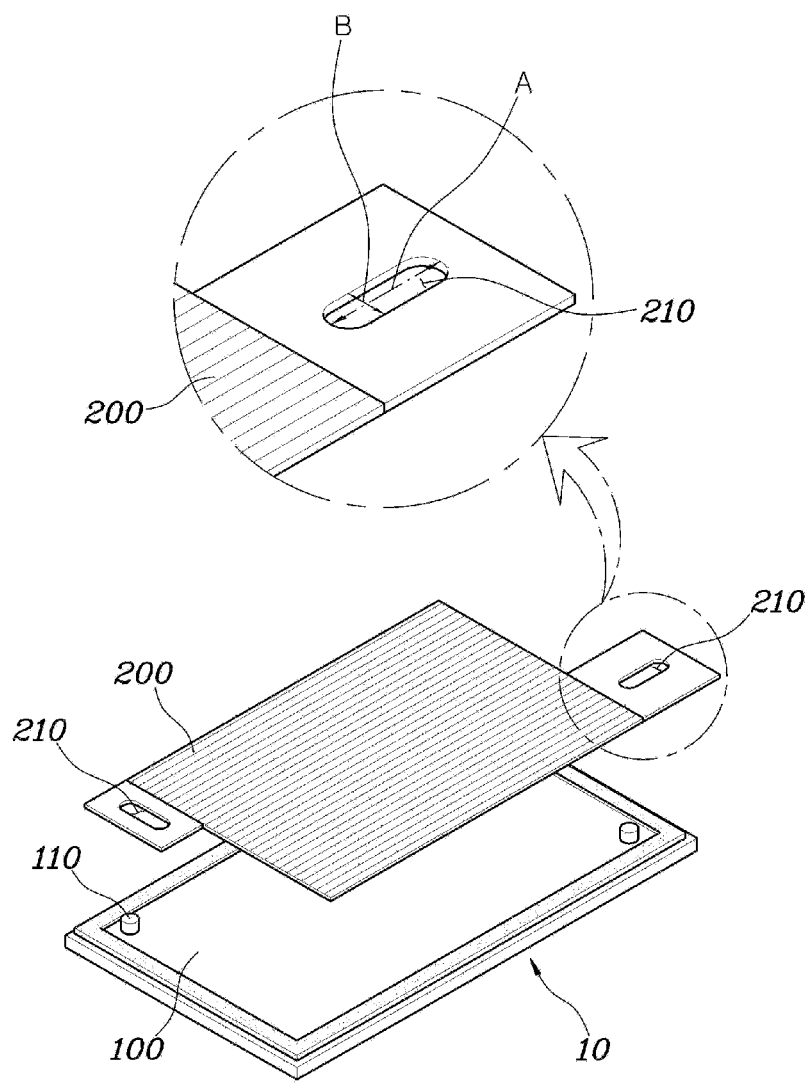
FIG. 2 is a view illustrating a separator according to an embodiment of the present invention.
Figure 3:
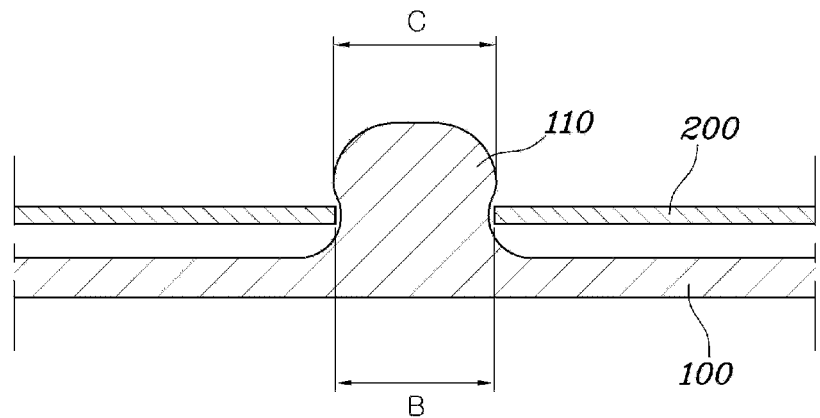
FIG. 3 is a view illustrating the coupling of a coupling protrusion with a coupling hole according to an embodiment of the present invention.

FIG. 2 is a view illustrating a separator according to an embodiment of the present invention, and FIG. 3 is a view illustrating the coupling of a coupling protrusion with a coupling hole according to an embodiment of the present invention.

As illustrated in FIGS. 2 and 3, a separator 10 for a fuel cell according to an embodiment of the present invention includes a separation plate 100 that has coupling protrusions 110 on an edge thereof, and a porous body 200 that has coupling holes 210 into which the coupling protrusions 110 are fixedly inserted, and is coupled to a plane of the separation plate 100.

The separation plate 100 is made of metallic material in the form of a flat plate. The porous body 200 is made of conductive material having a microporous structure, such as metal foam, carbon foam or wire mesh, and is coupled to the plane of the separation plate, thus defining a path in which reactive gases flow.

The porous body 200 according to the embodiment of the present invention may be fabricated by forming a porous structure such as micro holes and a channel on a metallic thin plate using a pressing method and thereby forming a three-dimensional microporous structure.

The porous body 200 made in this way is integrally secured to the plane of the separation plate 100 via the coupling protrusions 110 and the coupling holes 210, and uniformly compresses a gas diffusion layer (GDL) 6 to disperse surface pressure, thus minimizing electric resistance and maximizing the performance of the fuel cell.

Further, when the separator is fixed using a conventional welding method, it is possible to prevent the corrosion resistance of a welded part from being reduced, to prevent airtightness from being reduced due to micro cracks of the welded part, and to obviate the necessity of replacing and managing the welded part at certain time intervals, thus realizing a reduction in management cost and minimizing the deformation of the separator 10.

Particularly, even if the thickness of the separation plate 100 is formed to be 0.1 mm or less, a separate welding process for fixing the porous body 200 is not required, thus minimizing a reduction in stackability due to damage such as deformation.

Preferably, the separation plate 100 and the porous body 200 according to the embodiment of the present invention are characterized in that at least one pair of coupling protrusions 110 and coupling holes 210 are located to face each other. This is because, if the separation plate 100 and the porous body 200 are coupled with each other via a single coupling protrusion 110 and coupling hole 210, rotation may be undesirably performed about a coupling portion. Thus, it is preferable to form at least one pair of coupling portions so as to fix a coupled position.

The coupling hole 210 according to the embodiment of the present invention is formed to have the shape of a slit extending in one direction. Preferably, the coupling hole 210 is formed such that the length of a minor axis B thereof corresponds to a diameter of the coupling protrusion 110.

Conventionally, in the case of fixing both ends using spot welding or the like when the separation plate 100 is coupled with the porous body 200, the separation plate 100 and the porous body 200 having relatively large widths may be separated from each other at a central portion due to a difference in width between the separation plate 100 and the porous body 200 when the separation plate 100 is coupled with the porous body 200.

Such a separation phenomenon makes it difficult to ensure the flatness of the separation plate 100 and the porous body 200, thus causing a reduction in performance and durability due to non-uniformity of surface pressure, and makes it difficult to assemble the fuel cell stack, thus causing a reduction in performance.

Thereby, the coupling hole 210 of the porous body 200 according to the embodiment of the present invention is formed in the shape of the slit, and the coupling protrusion 110 is inserted into the coupling hole 210. In this state, the coupling protrusion is movable by the length of a major axis A in the direction of the major axis A of the coupling hole 210. Such a configuration may absorb deformation due to springback when the separation plate 100 is coupled with the porous body 200, thus preventing the separation phenomenon from occurring, and ensuring the flatness of the separation plate 100 and the porous body 200. Consequently, it is possible to improve the assemblability and performance of the fuel cell stack.

Preferably, the coupling holes 210 disposed on both ends of the porous body 200 to be opposite to each other are formed such that their major axes A are perpendicular to each other. The reason is because the porous body 200 and the separation plate 100 each having the shape of a rectangular flat plate should not be deformed in perpendicular directions, i.e. both a widthwise direction and a longitudinal direction.

Preferably, the coupling protrusion 110 according to the embodiment of the present invention is formed such that a diameter C of a protruding end thereof is larger than the length of the minor axis B of the coupling hole 210. The reason is because it is possible to prevent the coupling protrusion 110 inserted into the coupling hole 210 from being removed from the coupling hole 210.

Figure 4:
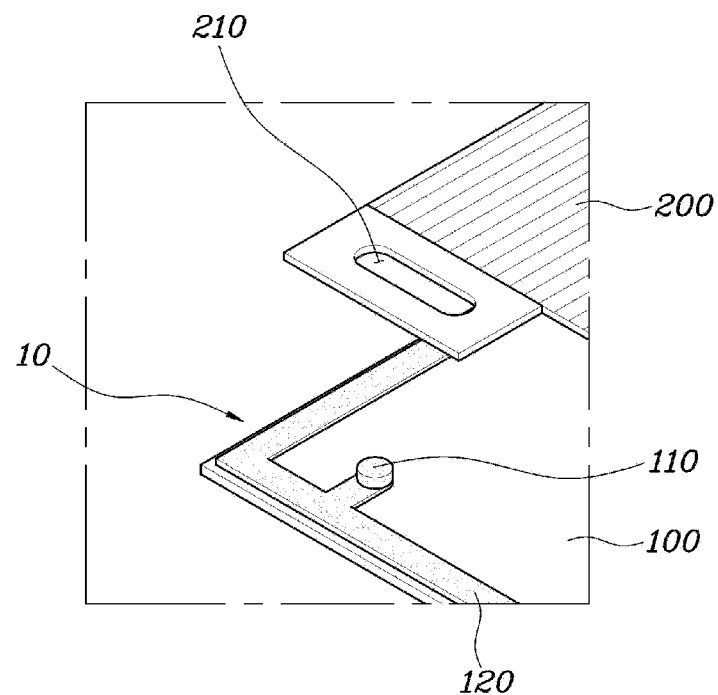
FIG. 4 is a view illustrating a separator according to another embodiment of the present invention.

FIG. 4 is a view illustrating a separator according to another embodiment of the present invention.

As illustrated in FIG. 4, the separator 10 according to another embodiment of the present invention further includes a gasket 120 attached to an edge of a plane thereof. Here, the coupling protrusion 110 extends from the gasket 120 and then protrudes upwards. Thus, the coupling protrusion 110 formed on the gasket 120 secured to the plane of the separation plate 100 is fixedly inserted into the coupling hole 210 of the porous body 200, so that the separation plate 100 may be integrally coupled with the porous body 200.

Figure 5:
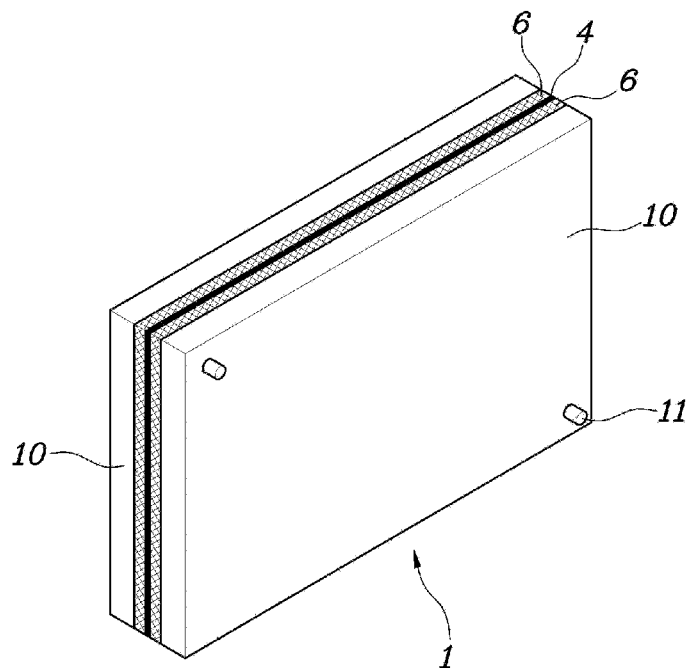
FIG. 5 is a view illustrating a unit cell of a fuel cell according to an embodiment of the present invention.
Figure 6:
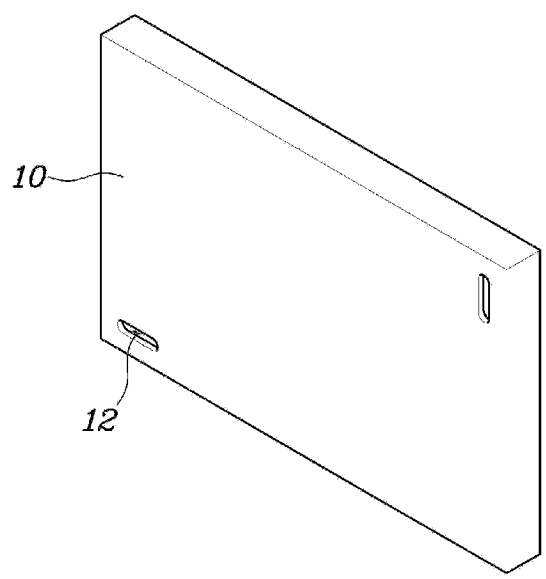
FIG. 6 is a view illustrating a fixing groove according to an embodiment of the present invention.
Figure 7:
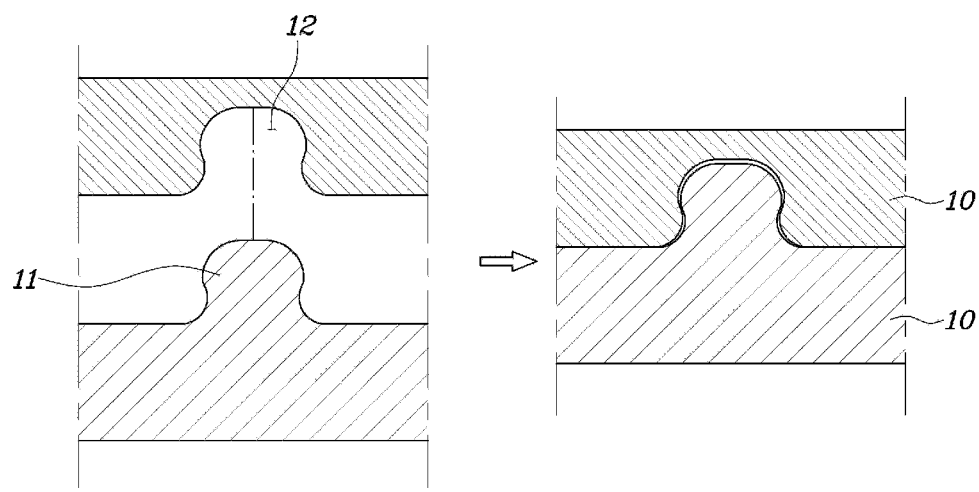
FIG. 7 is a view illustrating the coupling of a fixing protrusion with a fixing groove according to an embodiment of the present invention.

FIG. 5 is a view illustrating a unit cell of a fuel cell according to an embodiment of the present invention, FIG. 6 is a view illustrating a fixing groove according to an embodiment of the present invention, and FIG. 7 is a view illustrating the coupling of a fixing protrusion with a fixing groove according to an embodiment of the present invention.

As illustrated in FIGS. 5 to 7, according to an embodiment of the present invention, a plurality of unit cells 1 is stacked to constitute a fuel cell. The unit cell includes a membrane electrode assembly (MEA) 4, a pair of gas diffusion layers (GDL) 6 and a pair of separators 10 that are attached to both sides of the membrane electrode assembly 4.

Here, in order to improve the stackability of neighboring separators 10 similarly to the above-described coupling structure of the separation plate 100 with the porous body 200, a fixing protrusion 11 protrudes from one separator 10 selected from the pair of separators 10, while a fixing groove 12 is formed in the remaining separator 10 to allow the fixing protrusion 11 to be fixedly inserted therein.

Such a configuration may improve the stackability of neighboring separators 10, thus making it easy to assemble the fuel cell stack and thereby shortening a manufacturing period and increasing productivity, and in addition, may minimize the deformation of the unit cell 1 of the fuel cell, thus enhancing the performance and service life of the fuel cell.

Similarly to the coupling protrusion 110 and the coupling hole 210, a plurality of fixing protrusions 11 and fixing grooves 12 are provided according to an embodiment of the present invention. Each fixing groove 12 is formed in the shape of a slit, thus allowing the fixing protrusion 11 inserted into the fixing groove 12 to be movable within a predetermined range.

Further, the fixing grooves 12 disposed to be opposite to each other are formed such that their major axes are perpendicular to each other, thus preventing the unit cell 1 of the fuel cell from being deformed and thereby improving the stackability of the unit cells 1 of the fuel cell.

Preferably, the fixing protrusion 11 according to the embodiment of the present invention may be formed such that a diameter thereof increases towards an end in a protruding direction thereof. Further, the fixing groove 12 may be formed such that it has a shape corresponding to a section of the fixing protrusion 11 and its width gradually increases in a direction in which the fixing protrusion 11 is inserted.

Therefore, such a configuration prevents the fixing protrusion 11 from being removed from the fixing groove 12 when neighboring unit cells 1 of the fuel cell are coupled with each other, thus increasing stackability and a coupling force between the unit cells 1 of the fuel cell.

The present invention makes it easy to align a porous body with a separator when unit cells of a fuel cell are assembled, thus enhancing assemblability, and may obviate the necessity of performing a separate welding process for the purpose of fixing may be omitted, thus preventing corrosion resistance from being reduced and shortening an assembly time, and consequently leading to an increase in productivity.

Further, even if the thickness of the separator is reduced, it is possible to minimize deformation and damage in a process of assembling the unit cells of the fuel cell, and it is possible to reduce the volume and weight of the fuel cell, thus enhancing the performance of a vehicle.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A separator for a fuel cell comprising:
   a separation plate provided with a first coupling protrusion that protrudes from a first edge of the separation plate and a second coupling protrusion that protrudes from a second edge of the separation plate; and
   a porous body provided with a first coupling hole adjacent a first edge of the porous body and a second coupling hole adjacent a second edge of the porous body, wherein the first coupling protrusion is inserted in the first coupling hole and the second coupling protrusion is inserted in the second coupling hole so that the porous body is coupled to a plane of the separation plate, the porous body defining a path in which reactive gases can flow;
   wherein the first coupling protrusion faces the first coupling hole and the second coupling protrusion faces the second coupling hole;
   wherein each of the coupling holes is formed in a shape of a slit and has a width such that a length of a minor axis of the coupling hole corresponds to a diameter of the corresponding coupling protrusion;
   wherein the first edge of the porous body is opposite the second edge of the porous body and the first edge of the separation plate is opposite the second edge of the separation plate; and wherein a major axis of the first coupling hole is perpendicular to a major axis of the second coupling hole.

2. The separator according to claim 1, wherein each of the first and second coupling protrusions is formed such that a diameter of an end thereof is larger than the length of the minor axis of the corresponding coupling hole.

3. The separator according to claim 2, wherein the first coupling protrusion is inserted into the first coupling hole to be movable in a direction of a major axis of the first coupling hole.

4. The separator according to claim 3, wherein the separator is configured to absorb deformation due to springback when the separation plate is coupled with the porous body, and consequently securing flatness.

5. The separator according to claim 1, wherein the separation plate further comprises a gasket attached to the plane thereof, the first coupling protrusion being formed on the gasket.

6. A separator for a fuel cell comprising:
a separation plate provided with a first coupling protrusion that protrudes from a first edge thereof and a second coupling protrusion that protrudes from a second edge thereof, the first edge being opposite the second edge; and
a porous body having a main surface parallel to a main surface of the separation plate and defining a path in which reactive gases can flow, the porous body provided with a first coupling hole adjacent a first edge thereof and adjacent the first coupling protrusion and also provided with a second coupling hole adjacent a second edge thereof and adjacent the second coupling protrusion, wherein the first and second coupling holes are each formed in a shape of a slit having a major axis and a minor axis, the major axis being longer than the minor axis, and wherein each coupling hole has a width of the minor axis that corresponds to a diameter of the corresponding coupling protrusion, and wherein the major axis of the first coupling hole is perpendicular to the major axis of the second coupling hole in a plane that extends between the first and second edges of the porous body.

7. The separator according claim 6, wherein each of the first and second coupling protrusions is formed such that a diameter of an end thereof is larger than a length of the minor axis of the corresponding coupling hole.

8. The separator according to claim 7, wherein the first coupling protrusion is inserted into the first coupling hole to be movable in a direction of a major axis of the first coupling hole.

9. The separator according to claim 8, wherein the separator is configured to absorb deformation due to springback when the separation plate is coupled with the porous body.

10. The separator according to claim 6, wherein the separation plate further comprises a gasket attached to the plane thereof, the first coupling protrusion being formed on the gasket.

* * * * *